US011670112B2

(12) United States Patent
Watanabe (10) Patent No.: US 11,670,112 B2
(45) Date of Patent: Jun. 6, 2023

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Kentaro Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/950,984

(22) Filed: Nov. 18, 2020

(65) Prior Publication Data
US 2021/0158022 A1 May 27, 2021

(30) Foreign Application Priority Data
Nov. 21, 2019 (JP) .............................. JP2019-210626

(51) Int. Cl.
*G06V 40/16* (2022.01)
*H04N 23/80* (2023.01)
*H04N 5/232* (2006.01)

(52) U.S. Cl.
CPC ........... *G06V 40/171* (2022.01); *H04N 23/80* (2023.01)

(58) Field of Classification Search
CPC .... G06V 40/171; G06V 40/10; G06V 40/161; G06V 10/25; G06V 20/10; H04N 5/23229; H04N 5/23219; H04N 5/232127
See application file for complete search history.

(56) References Cited

U.S. PATENT DOCUMENTS

| 9,041,776 | B2 * | 5/2015 | Chou | H04N 13/239 |
| | | | | 348/46 |
| 10,789,693 | B2 * | 9/2020 | Kuo | G06T 5/50 |
| 10,846,560 | B2 * | 11/2020 | Xu | G06V 40/162 |
| 2005/0031173 | A1 * | 2/2005 | Hwang | G06V 40/18 |
| | | | | 382/118 |

(Continued)

FOREIGN PATENT DOCUMENTS

| CN | 105825189 B | 3/2019 |
| JP | 2000-194861 A | 7/2000 |

(Continued)

OTHER PUBLICATIONS

Ju Hong Yoon, et al., Interacting Multiview Tracker, IEEE Transactions on Pattern Analysis and Machine Intelligence, vol. 38, No. 5, May 2016, pp. 903-917.

(Continued)

*Primary Examiner* — Hung H Lam
(74) *Attorney, Agent, or Firm* — Cowan, Liebowitz & Latman, P.C.

(57) ABSTRACT

An image processing apparatus comprises a first detection circuits that detect a predetermined partial area from image data separately using a first method and a second method; and second detection circuits that detect a predetermined feature area from data of the detected partial areas. The apparatus selects, as a final detection result of the feature area, one of a detection result of the feature area for the partial area detected using the first method and a detection result of the feature area for the partial area detected using the second method, wherein the partial areas are related to an identical subject.

14 Claims, 7 Drawing Sheets

(56) References Cited

U.S. PATENT DOCUMENTS

| | | | |
|---|---|---|---|
| 2007/0122040 A1 | 5/2007 | Au et al. | |
| 2008/0158346 A1* | 7/2008 | Okamoto | H04N 23/667 348/51 |
| 2011/0164816 A1* | 7/2011 | Guo | G06V 40/164 382/199 |
| 2013/0170724 A1* | 7/2013 | Kim | G06T 15/00 382/131 |
| 2019/0174068 A1 | 6/2019 | Wang et al. | |
| 2022/0030160 A1* | 1/2022 | Hashigami | H04N 5/2351 |

FOREIGN PATENT DOCUMENTS

| | | |
|---|---|---|
| JP | 2008-129664 A | 6/2008 |
| KR | 2010-0130670 A | 12/2010 |
| WO | 2018/133874 A1 | 7/2018 |
| WO | 2019/114036 A1 | 6/2019 |

OTHER PUBLICATIONS

European Search Report dated Feb. 24, 2021, which is enclosed, that issued in the corresponding European Patent Application No. 20206108.1.

* cited by examiner

IMAGE PROCESSING APPARATUS, IMAGE PROCESSING METHOD, AND IMAGE CAPTURE APPARATUS

BACKGROUND OF THE INVENTION

Field of the Invention

The present invention relates to an image processing apparatus, an image processing method, and an image capture apparatus and particularly relates to technology for detecting a feature area from an image.

Description of the Related Art

Technology for detecting a partial area (feature area) including a predetermined feature from an image is used in various fields. For example, in an image capture apparatus such as a digital camera, focus adjustment is performed to focus on a feature area and exposure is controlled to make the brightness of the feature area appropriate. In Japanese Patent Laid-Open No. 2008-12664, an image processing apparatus is described that detects an area as the feature area.

In Japanese Patent Laid-Open No. 2008-12664, first a face area is detected from an image, then an eye area is detected from the detected face area. By first detecting a partial area which is expected to contain the feature area to be finally detected in this manner and limiting the area for detecting the feature area, the processing speed and detection accuracy can be increased, for example. However, unless the partial area can be correctly detected, the detection of the feature area also results in a failure.

SUMMARY OF THE INVENTION

In light of such problems in the related art, embodiments of the present invention provide an image processing apparatus, an image processing method, and an image capture apparatus capable of detecting a feature area with high accuracy using less processing.

According to an aspect of the present invention, there is provided an image processing apparatus, comprising one or more processors, when executing a program, function as: a first detection unit configured to detect a predetermined partial area from image data separately using a first method and a second method; a second detection unit configured to detect a predetermined feature area from data of the detected partial areas; and a selection unit configured to select, as a final detection result of the feature area, one of a detection result of the feature area for the partial area detected using the first method and a detection result of the feature area for the partial area detected using the second method, wherein the partial areas are related to an identical subject.

According to another aspect of the present invention, there is provided an image capture apparatus, comprising: an image capture device that generates image data; one or more processors, when executing a program, function as: a first detection unit configured to detect a predetermined partial area from image data separately using a first method and a second method; a second detection unit configured to detect a predetermined feature area from data of the detected partial areas; and a selection unit configured to select, as a final detection result of the feature area, one of a detection result of the feature area for the partial area detected using the first method and a detection result of the feature area for the partial area detected using the second method, wherein the partial areas are related to an identical subject; and a control unit configured to perform focus detection and/or exposure control of the detection result of the feature area selected by the selection unit.

According to a further aspect of the present invention, there is provided an image processing method executed by an image processing apparatus, comprising: detecting a predetermined partial area from image data separately using a first method and a second method; detecting a predetermined feature area from data of the detected partial area and selecting, as a final detection result of the feature area, one of a detection result of the feature area for the partial area detected using the first method or a detection result of the feature area for the partial area detected using the second method, wherein the partial areas are related to an identical subject.

According to another aspect of the present invention, there is provided a non-transitory machine-readable medium storing a program, when executed by one or processors, causes the one or more processors to function as an image processing apparatus that comprises: a first detection unit configured to detect a predetermined partial area from image data separately using a first method and a second method; a second detection unit configured to detect a predetermined feature area from data of the detected partial areas; and a selection unit configured to select, as a final detection result of the feature area, one of a detection result of the feature area for the partial area detected using the first method and a detection result of the feature area for the partial area detected using the second method, wherein the partial areas are related to an identical subject.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the embodiments described below, the present invention is embodied as an interchangeable-lens digital camera system. However, the present invention can be applied to any electronic device capable of handling image data. Examples of such an electronic device include video cameras, computer devices (personal computers, tablet computers, media players, PDAs, and the like), mobile phones, smartphones, game consoles, robots, drones, and drive recorder. These are examples, and the present invention can be applied to other electronic devices.

First Embodiment

Figure 1:
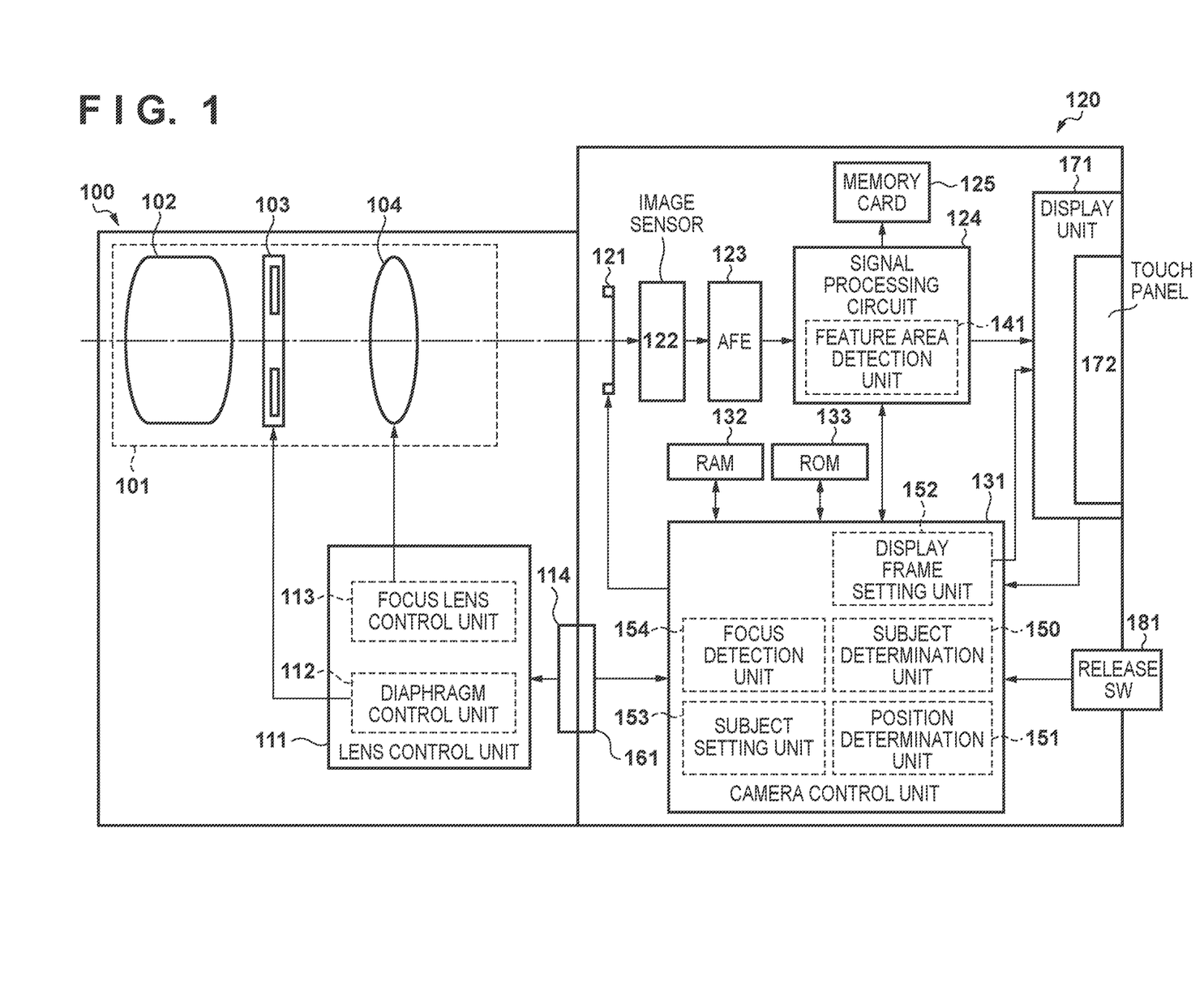
FIG. 1 is a functional block diagram of a camera which is an example of an image processing apparatus according to an embodiment.

FIG. 1 is a block diagram illustrating the functional configuration of an interchangeable-lens digital camera system (hereinafter, simply referred to as a camera), which is an example of an image processing apparatus according to a first embodiment of the present invention. The camera includes a body 120 and an interchangeable lens 100. Note that the lens may not be interchangeable.

The interchangeable lens 100 that forms an optical image of the subject includes a lens unit 101. The lens unit 101 includes a main imaging optical system 102, a diaphragm 103, and a focus lens 104. Note that the main imaging optical system 102 and the focus lens 104 are actually constituted by a plurality of lenses. The lens unit 101 also includes a motor, an actuator, and the like to drive the movable members, such as the diaphragm 103 and the focus lens 104. The lens unit 101 may also include an image stabilization lens, a zoom lens, and other movable members.

A lens control unit 111 includes a microprocessor, ROM, and RAM and realizes various functions by a program stored on the ROM being read out to the RAM and executed by a microprocessor. Functional blocks 112 and 113 illustrated within the lens control unit 1 in FIG. 1 are schematically illustrated representative functions realized by a program being executed by a microprocessor of the lens control unit 111.

The lens control unit 111 communicates with a camera control unit 131 and controls the drive of the focus lens 104 and the diaphragm 103 on the basis of instructions from the camera control unit 131. Also, the lens control unit 111 provides information relating to the lens unit 101, such as the position and f-number of the focus lens 104, to the camera control unit 131.

In the body 120, an image sensor 122 such as a complementary metal oxide semiconductor (CMOS) image sensor includes a plurality of pixels arranged in a 2-dimensional array. The image sensor 122 photoelectrically converts the optical image of the subject formed by the interchangeable lens 100 via the plurality of pixels and outputs a group of electrical signals (analog image signal). A shutter 121 is provided between the interchangeable lens 100 and the image sensor 122. Note that in the case in which the diaphragm 103 also functions as a shutter, the shutter 121 is not necessary.

The analog image signal output by the image sensor 122 is input into an analog front-end (AFE) 123. After applying noise reduction processing and/or AD conversion processing to the analog image signal, the AFE 123 outputs the analog image signal as a digital image signal (image data).

A signal processing circuit 124 applies a preset image processing to the image data output by the AFE 123 and generates a signal or image data, obtains and/or generates various information, and the like. The signal processing circuit 124 may be, for example, a dedicated hardware such as an application-specific integrated circuit (ASIC) designed to realize a specific function or may be configured to realize a specific function via a programmable processor such as a digital signal processor (DSP) executing a software.

The image processing that the signal processing circuit 124 is capable of applying to the image data includes color interpolation processing, correction processing, detection processing, data modification processing, evaluation value calculation processing, and the like.

The color interpolation processing is processing for interpolating values of color components that are insufficiently found in the pixel data that forms the image data, and is also referred to as demosaicing processing.

The correction processing includes white balance adjustment, processing for correcting the effects of optical aberration of the lens unit 101, processing for correcting tone, and the like.

The detection processing includes processing for detecting the feature area processing for tracking the feature area, processing for recognizing a person, and the like.

The data modification processing includes scaling processing, image data for display generation processing, encoding and decoding processing, header information generation processing, and the like.

The evaluation value calculation processing is processing for generating signals or evaluation values that are used in automatic focus detection (AF), processing for generating evaluation values that are used in automatic exposure control (AE), and the like.

Note that these are simply examples of the image processing that can be applied to the image data by the signal processing circuit 124, and these examples are not intended to limit the image processing applied to the image data by the signal processing circuit 124. Also, one or more of the image processing given as an example above may be executed by the camera control unit 131.

The image data post image processing by the signal processing circuit 124 is output to one or more of: the camera control unit 131, a display unit 171, and a memory card 125 depending on the application.

A feature area detection unit 141 is schematically illustrated in FIG. 1 as a functional block with a function, from among the functions of the signal processing circuit 124, of executing processing for detecting the feature area. The feature area detection unit 141 in the present embodiment is configured to finally detect, as the feature area, the eye area or the pupil area. However, the feature area detection unit 141 may detect another portion of the face, such as the nose or mouth. The feature area detection unit 141 first detects, in the image data, partial areas (in this example, the face or head area) expected to contain the feature area. Then, the feature area detection unit 141 detects the feature area from each of the partial areas. The feature area detection unit 141 outputs the detection results (for example, information indicating the position and size of the area detected) relating to the partial areas and the feature area to the camera control unit 131.

The camera control unit 131 is a microprocessor, for example, and realizes various functions by a program stored in ROM 133 being read out to RAM 132 and executed by a microprocessor. Functional blocks 150 to 154 illustrated within the camera control unit 131 in FIG. 1 are schematically illustrated representative functions realized by a program being executed by a microprocessor of the camera control unit 131.

The ROM 133 is a rewritable non-volatile memory, for example, and stores a program executable by the microprocessor of the camera control unit 131, setting values, GUI data, and the like. The RAM 132 is used to temporarily hold values required by a program executed by the microprocessor of the camera control unit 131 and during execution of the program.

The body 120 and the interchangeable lens 100 are both provided with a mount that engages with the other. The mount of the body 120 and the mount of the interchangeable lens 100 are provided with a mount contact unit 114, 161 configured to come into contact with one another when the mounts are engaged. By bringing the mount contact parts 114, 161 into contact with one another, power can be supplied from the body 120 to the interchangeable lens 100 and communication between the camera control unit 131 and the lens control unit 111 is enabled.

The lens control unit 111 and the camera control unit 131 communicate via serial communication at a predetermined timing via the mount contact parts 114 and 161. This communication allows focus lens drive information, diaphragm drive information, and the like to be transmitted from the camera control unit 131 to the lens control unit 1/1 and allows focus lens position, f-number, focal length, and the like to be transmitted from the lens control unit 111 to the camera control unit 131.

A subject determination unit 150 of the camera control unit 131 determines the same subject from the detection results of the partial areas. Also, a position determination unit 151 determines the feature area on the basis of the detection results of the feature area and the determination result of the subject determination unit 150. A display frame setting unit 152 sets a detection frame displayed on the display unit 171 described below. Furthermore, a subject setting unit 153 notifies a focus detection unit 154 of information that identifies an image area of the subject (target subject) for the lens unit 101 to focus on. These functional blocks 150 to 153 operate on the basis of the detection results of the feature area detection unit 141.

The focus detection unit 154 adjusts the position of the focus lens 104 of the lens unit 101 to focus on the image area on the basis of the information provided by the subject setting unit 153. The focus detection unit 154 can adjust the position of the focus lens 104 via a known method. For example, the focus detection unit 154 is capable of focus detection by contrast. The focus detection unit 154 moves the position of the focus lens 104 in steps and captures images and acquires, from the signal processing circuit 124, a contrast evaluation value relating to, from among the image data obtained from capturing images, the image area to be focused on. Also, the focus detection unit 154 obtains the position of the focus lens 104 with the greatest contrast evaluation value and instructs the lens control unit 111 to drive the focus lens 104 to that position.

Note that in the case in which the body 120 generates an image signal for phase detection AF, the focus detection unit 154 is capable of focus detection by phase detection. For example, in other example, the body 120 includes a sensor for phase detection AF or the image sensor 122 has a configuration suitable for image plane phase detection AF.

Note that in the case in which instructions to drive the focus lens 104 are sent from the focus detection unit 154 to the lens control unit 111, the instruction may be of target position of the focus lens 104 or may be of the difference between the current position and the target position, such as the defocus amount. The lens control unit 111 (focus lens control unit 113) controls the drive of the focus lens 104 on the basis of the information received via instruction from the camera control unit 131. In this way, the camera control unit 131 controls the drive of the focus lens 104 via the focus lens control unit 113.

The display unit 171 is a touch display including video memory, a display controller, a display device, and a touch panel 172. In the present embodiment, the display unit 171 functions as an electronic viewfinder (EVF) by continuously capturing video and displaying the captured video in real time on the display unit 171 when the apparatus is in an image capturing standby state. Also, a GUI such as a menu screen and information such as setting values and the like are displayed on the display unit 171. Furthermore, image data readout from the memory card 125 and decoded by the signal processing circuit 124 is also displayed on the display unit 171.

The display unit 171 of the present embodiment, being a touch display, is capable of receiving touch operations performed on the touch panel 172. Operations performed on the touch panel 172 are detected by the camera control unit 131, the touch operations are recognized on the basis of time change of the touch position and the like, and processing according to the recognized touch operation is executed.

A release switch (SW) 181 is an input device into which instructions relating to still image capturing are input. For example, the release SW 181 includes a switch (SW1) that turns ON in a half-pressed state and a switch (SW2) that turns ON in a fully pressed state. The camera control unit 131 recognizes the SW1 being ON as an instruction to prepare for still image capturing and executes AF, and AE processing. Furthermore, the camera control unit 131 recognizes the SW2 being ON as an instruction to start still image capturing and controls still image capturing processing and generation processing of image data for recording, recording processing of image data, and the like. The image data for recording is recorded on the memory card 125.

Figure 2:
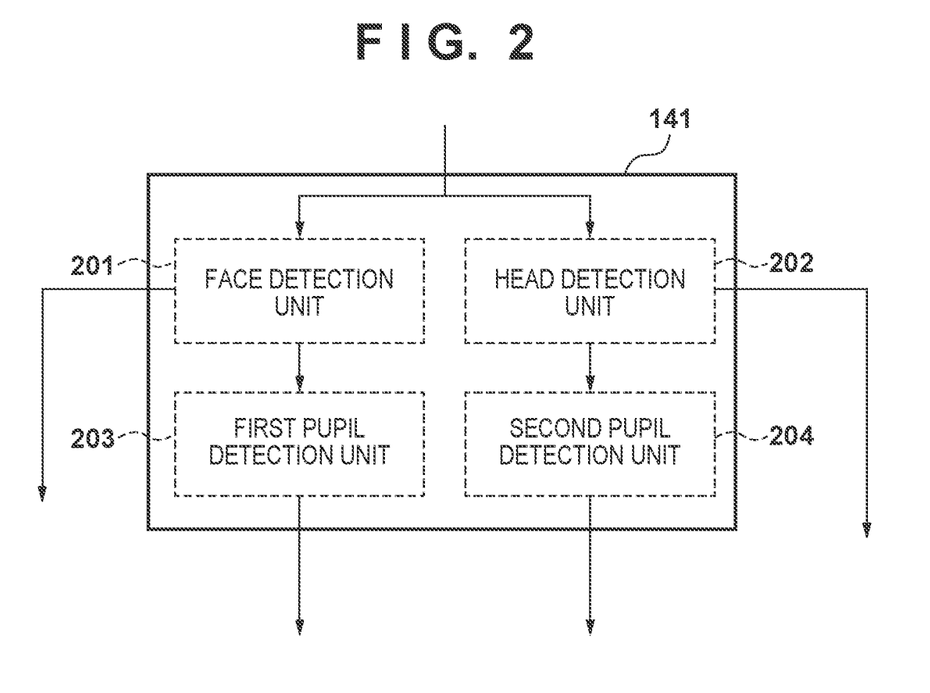
FIG. 2 is a functional block diagram of a feature area detection unit of a first embodiment.

Next, the configuration and operation of the feature area detection unit 141 of the present embodiment will be described. FIG. 2 is a diagram illustrating the functions of the feature area detection unit 141 subdivided further and as functional blocks. As described above, the feature area detection unit 141 is a function of the signal processing circuit 124. Thus, the functional blocks of the feature area detection unit 141 are also functions of the signal processing circuit 124.

The feature area detection unit 141 includes a face detection unit 201 and a head detection unit 202 that function as a first detection means that detects partial areas and a first pupil detection unit 203 and a second pupil detection unit 204 that function as a second detection means that detects feature areas from the partial areas.

The face detection unit 201 applies known face detection processing (first method) to the image data and detects a partial area (face area) that contains a facial feature. The specifics of the method for detecting the face is not particularly limited. For example, a method based on detecting a feature-like edge or pattern in the face area may be used or a method using a neural network trained with face areas via machine learning may be used. Specifically, the detection accuracy of a face area is dependent on the detection accuracy of a characteristic portions or organs of the face, such as eyes, a nose, and a mouth. Thus, in the case in which a part of these portions or organs cannot be detected, there is a tendency for face area detection to fail and for the possibility of false detection to increase.

The head detection unit 202 applies known head detection processing (second method) to the image data and detects a partial area that contains a head feature (a head area). The method for detecting the head area is not particularly limited. For example, a method for detecting an area of a predetermined shape such as an omega ($\Omega$)-shape may be used or a method using a neural network trained with head areas via machine learning may be used. Also, the head area may be detected in combination with detecting another unit of the human body, such as limbs or the torso. Because the head area is detected mainly based on the contour shape, it is not dependent on detecting a feature-like portion or organ of the face. Thus, even in the case in which the face detection unit 201 fails to detect a face area, the head detection unit 202 may succeed in correctly detecting a head.

The first pupil detection unit 203 detects an eye area or a pupil area from the face area detected by the face detection unit 201. The second pupil detection unit 204 detects an eye area or a pupil area from the head area detected by the head detection unit 202. The first pupil detection unit 203 and the second pupil detection unit 204 may use different detection methods or may use the same detection method. In the case in which the same detection method is used, the eye area or the pupil area may be detected using one pupil detection unit for the face area and the head area. The detection method is not particularly limited. For example, a method using pattern matching may be used or a method using a neural network trained with eye or pupil areas via machine learning may be used.

The operation of the face detection unit 201 and the first pupil detection unit 203 will be described using the flowchart of FIG. 3, and the operation of the head detection unit 202 and the second pupil detection unit 204 will be described using the flowchart of FIG. 4. Note that the feature area detection unit 141 may execute the operations in the order illustrated in FIG. 3 and FIG. 4 or may execute at least a part of the operations in parallel. Also, in this example, the feature area detection unit 141 captures images for the display device of the display unit 171 to function as an EVF and detects a feature area from image data constituting one frame of the video supplied from the AFE 123. However, the feature area detection unit 141 is capable of detecting a feature area from discretionary image data, such as video or still image data read out from the memory card 125, for example. Also, the signal processing circuit 124 may apply preprocessing to reduce the processing load or increase the detection accuracy to the image data before the processing by the feature area detection unit 141. Preprocessing may include but is not limited to resolution changing (scaling), color conversion, and the like.

Figure 3:
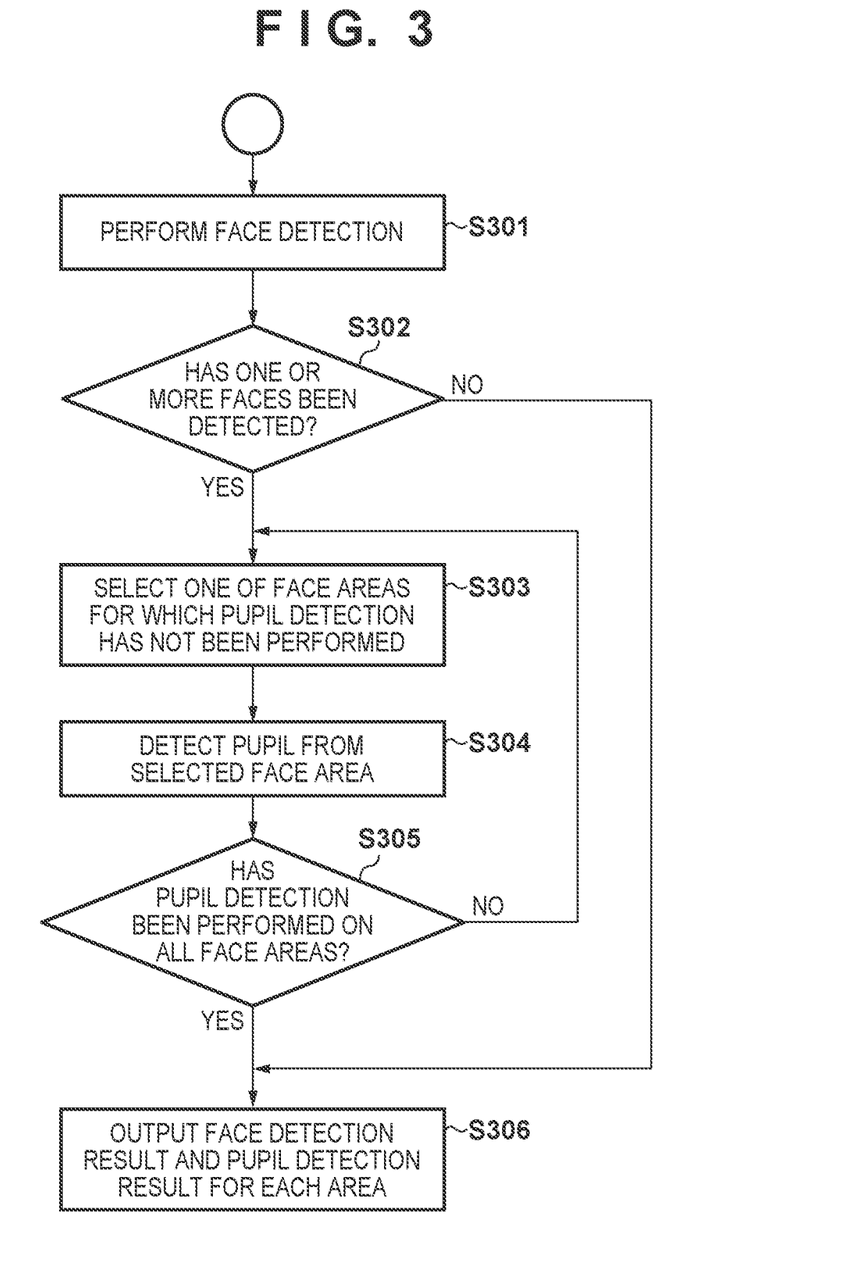
FIG. 3 is a flowchart relating to the operation of the feature area detection unit of the first embodiment.

As illustrated in FIG. 3, in step S301, the face detection unit 201 applies face detection processing to the supplied image data. Note that for the face detection unit 201, areas with a certain detection reliability or greater as a result of the face detection processing being applied are included as detection results. The face detection unit 201 outputs the detection results to the first pupil detection unit 203 and holds the detection results.

In step S302, the first pupil detection unit 203 determines whether or not one or more face areas have been detected by the face detection unit 201. If one or more face areas have been detected by the first pupil detection unit 203, step S303 is executed. If no face areas have been detected by the first pupil detection unit 203, step S306 is executed.

In step S303, the first pupil detection unit 203 sets one of the face areas for which pupil detection has not been performed as the pupil detection area, and then step S304 is executed.

In step S304, the first pupil detection unit 203 applies pupil detection processing to the pupil detection area set in step S303. Note that eye detection processing may be applied instead of pupil detection processing. Note that for the first pupil detection unit 203, areas with a certain detection reliability or greater as a result of the pupil detection processing being applied are included as detection results. The first pupil detection unit 203 holds the detection results, and then step S305 is executed.

In step S305, the first pupil detection unit 203 determines whether or not pupil detection processing has been applied to all of the face areas detected in step S301. In the case in which it is determined that there is a face area to which pupil detection processing has not been applied, the first pupil detection unit 203 repeats execution of the processing from step S303. In the case in which the first pupil detection unit 203 determines that pupil detection processing has been applied to all of the face areas, the feature area detection unit 141 executes step S306.

In step S306, the feature area detection unit 141 outputs, to the camera control unit 131, the face detection results held by the face detection unit 201 and the pupil detection results held by the first pupil detection unit 203. In each of the detection results, included is information indicating at least the center coordinates (image coordinates), size, and detection reliability of the detected area. Note that in the case in which no face areas are detected in step S302, the feature area detection unit 141 outputs an empty result.

Figure 4:
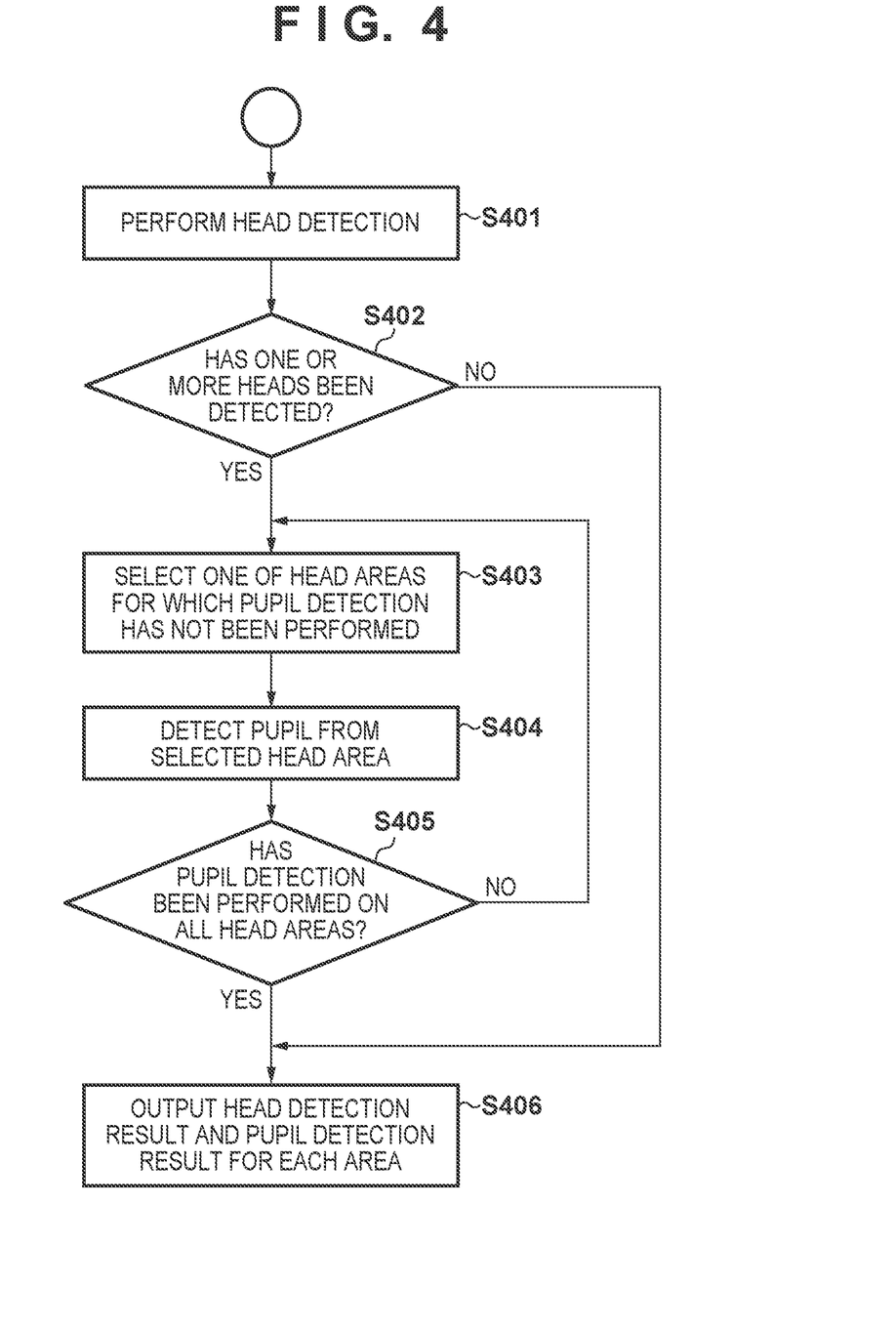
FIG. 4 is a flowchart relating to the operation of the feature area detection unit of the first embodiment.

As illustrated in FIG. 4, in step S401, the head detection unit 202 applies head detection processing to the supplied image data. Note that for the head detection unit 202, areas with a certain detection reliability or greater as a result of the head detection processing being applied are included as detection results. The head detection unit 202 outputs the detection results to the second pupil detection unit 204 and holds the detection results.

In step S402, the second pupil detection unit 204 determines whether or not one or more head areas have been detected by the head detection unit 202. If one or more head areas have been detected by the second pupil detection unit 204, step S403 is executed. If no head areas have been detected by the second pupil detection unit 204, step S406 is executed.

In step S403, the second pupil detection unit 204 sets one of the head areas for which pupil detection has not been performed as the pupil detection area, and then step S404 is executed.

In step S404, the second pupil detection unit 204 applies pupil detection processing to the pupil detection area set in step S403. Note that eye detection processing may be applied instead of pupil detection processing. Note that for the second pupil detection unit 204, areas with a certain detection reliability or greater as a result of the pupil detection processing being applied are included as detection results. The second pupil detection unit 204 holds the detection results, and then step S405 is executed.

In step S405, the second pupil detection unit 204 determines whether or not pupil detection processing has been applied to all of the head areas detected in step S401. In the case in which it is determined that there is ahead area to which pupil detection processing has not been applied, the second pupil detection unit 204 repeats execution of the processing from step S403. In the case in which the second pupil detection unit 204 determines that pupil detection processing has been applied to all of the head areas, the feature area detection unit 141 executes step S406.

In step S406, the feature area detection unit 141 outputs, to the camera control unit 131, the head detection results held by the head detection unit 202 and the pupil detection results held by the second pupil detection unit 204. In each of the detection results, included is information indicating at least the center coordinates (image coordinates), size, and detection reliability of the detected area. Note that in the case in which no head areas are detected in step S402, the feature area detection unit 141 outputs an empty result.

Note that the feature area detection unit 141 may collectively output the detection results obtained from step S306 and step S406 or may output them separately.

Figure 5:
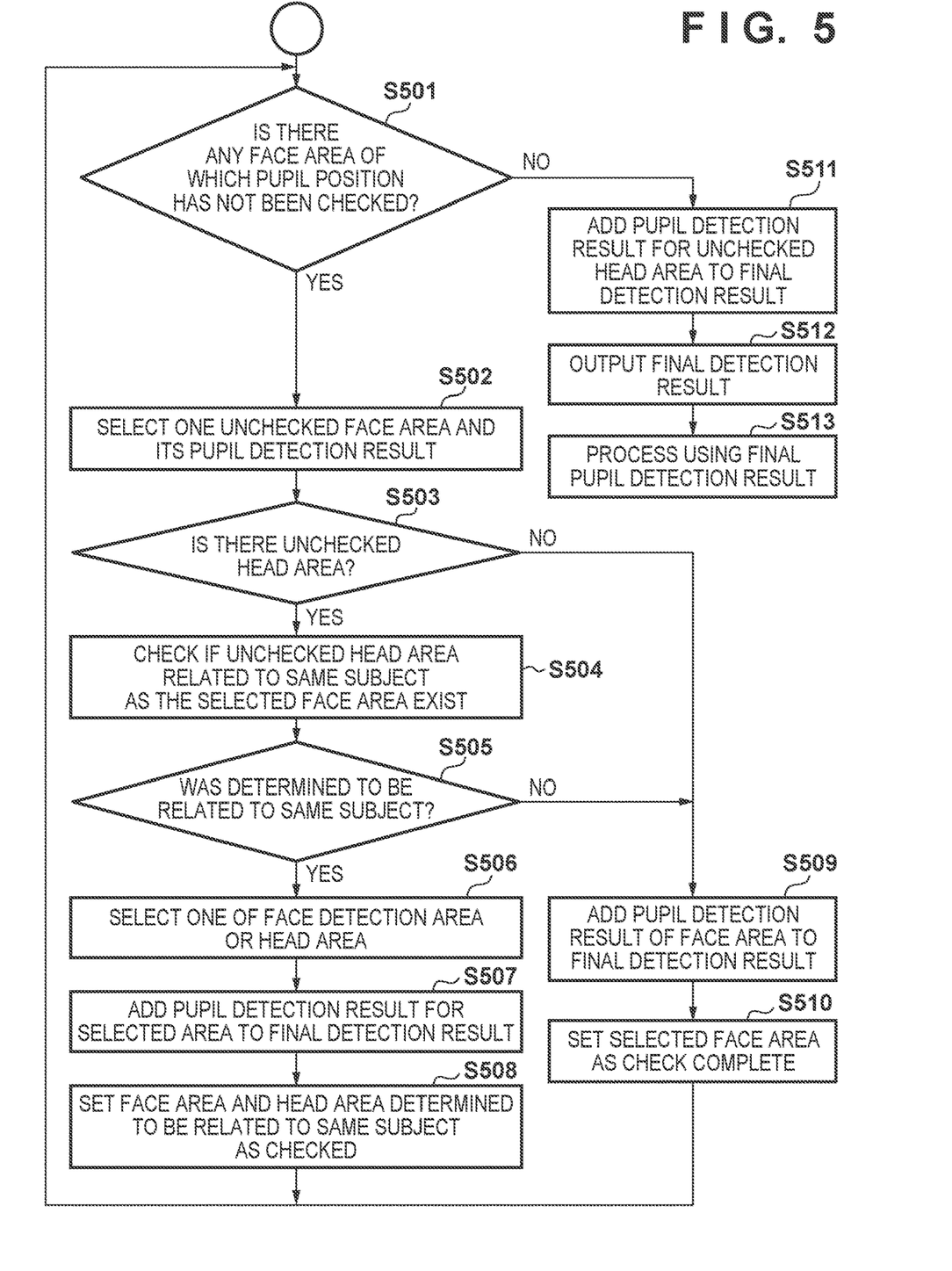
FIG. 5 is a flowchart relating to the operation of a camera control unit of the first embodiment.

Next, the operation of the camera control unit 131 using the detection results from the feature area detection unit 141 will be described using the flowchart of FIG. 5.

In step S501, the subject determination unit 150 determines whether or not there is a face area with a not yet set (hereinafter, referred to as unchecked) pupil position. In the case in which the subject determination unit 150 determines that there is an unchecked face area, step S502 is executed. In the case in which the subject determination unit 150 determines that there are no unchecked face areas, step S511 is executed. In the casein which not one face area is detected, the subject determination unit 150 determines that there are no unchecked face areas.

In step S502, the subject determination unit 150 selects an unchecked face area and the pupil detection result of the face area. The unchecked face area can be selected in any order.

In step S503, the subject determination unit 150 determines whether or not there is an unchecked head area. In the case in which the subject determination unit 150 determines that there is an unchecked head area, step S504 is executed. In the case in which the subject determination unit 150 determines that there are no unchecked head areas, step S509 is executed. In the case in which not one head area is detected, the subject determination unit 150 determines that there are no unchecked head areas.

In step S504, the subject determination unit 150 executes subject determination processing that detects a head area considered to be the same subject as that of the one face area selected in step S502 from among the unchecked face areas. Subject determination processing can be realized by a discretionary method and, for example, may be realized by a method that uses the distance and/or overlap ratio between the two areas targeted for determination processing. The distance may be the distance between representative coordinates of the areas, such as the center or the centroid coordinates. Also, for the overlap ratio, the Intersection over Union (IoU, also referred to as the Jaccard coefficient) may be used, for example. The IoU is the percentage of shared (overlapping) portion in the union of two areas.

IoU equals the size of the shared portion of the two areas divided by the size of the union of the two areas.

In the present embodiment, in the case in which the overlap ratio is equal to or greater than a threshold and the center or centroid coordinates of the each of the two areas are within the area of the other, the subject determination unit 150 determines that the two areas are areas of the same subject. Note that in the case in which, in one face area, a plurality of head areas are determined to be areas relating to the same subject, the subject determination unit 150 takes the head area with the highest overlap ratio with the face area as the final determination result. Furthermore, in the case in which a plurality of head areas have the highest overlap ratio, the head area with the smallest distance between the center coordinates of it and the face area is taken as the final determination result. In the case in which a plurality of head areas have the smallest distance between the center coordinates of it and the face area, one is selected by a discretionary method as the final detection result. The subject determination unit 150 outputs, to the position determination unit 151, information relating to a combination of the face area and the head area obtained as the final determination result. In the case in which there are no head areas determined to be related to the same subject as that of the face area, the subject determination unit 150 outputs empty information or outputs nothing.

In step S505, the position determination unit 151 determines whether or not a combination of a face area and a head area determined to be related to the same subject has been output from the subject determination unit 150. In the case in which the position determination unit 151 determines that it has been output, step S506 is executed. In the case in which the position determination unit 151 determines that it has not been output, step S509 is executed.

In step S506, the position determination unit 151 selects one area from among the face area and the head area determined by the subject determination unit 150 to be related to the same subject. The position determination unit 151 may, for example, select the area with the highest detection reliability or may select the area determined to have the better pupil detection result. In this example, "a better pupil detection result" has as a first condition that one or two pupil areas with a certain detection reliability or greater have been detected. Also, in the case in which three or more pupil areas have been detected, a second condition, in addition to the first condition, is that the difference in detection reliability of the third value onward to the top two detection reliability values is a certain value or greater. Note that the selection method described here is an example, and a method for selecting on the basis of other criteria may be used.

In step S507, the position determination unit 151 adds the pupil detection result for the face area or the head area selected in step S506 to the detection result of the feature area for the image data.

In step S508, the position determination unit 151 puts the face area and the head area determined by the subject determination unit 150, used in step S506, to be related to the same subject in a pupil position setting complete (check complete) state. Then, the process from step S501 is repeated.

In the case in which there are no unchecked head areas in step S503 or in the case in which there are no head areas determined to be related to the same subject as that of the face area in step S504, the position determination unit 151 executes step S509.

In step S509, the position determination unit 151 adds the pupil detection result for the face area selected in step S502 to the detection result of the feature area for the image data.

In step S510, the position determination unit 151 puts the face area selected in step S502 in a check complete state. Then, execution of the process from step S501 is repeated.

In the case in which the process described above is repeated and there are no more unchecked face areas or in the case in which the face detection unit 201 has not detected any face areas, the process transitions from step S501 to step S511.

In step S511, the position determination unit 151 adds the pupil detection result for the unchecked head area, in other words, the head area for which there are no face areas determined to be related to the same subject, to the detection result of the feature area for the image data. In the case in which the head detection unit 202 has not detected a head area, because there are no pupil detection results for the head area, nothing is added to the detection result of the feature area for the image data.

In step S512, the position determination unit 151 outputs, to the camera control unit 131, the detection result of the feature area for the image data added by the processing described above.

In step S513, the camera control unit 131 executes processing using the detection result of the feature area output by the position determination unit 151 in step S512. For example, an indicator indicating the detected feature area is superimposed on the EVF and focus detection is performed making the feature area a focus detection area (AF frame).

Specifically, the display frame setting unit 152 generates an image of a frame-like indicator corresponding to the center coordinates of the pupil area and the size of the pupil area included in the detection result of the feature area, writes the image to the video memory of the display unit 171, and superimposes the image on the video being displayed.

Also, the subject setting unit 153 notifies the focus detection unit 154 of information of the pupil area selected by a touch operation on the touch panel 172, for example, as setting information of the focus detection area. The focus detection unit 154 executes a focus detection operation of making the pupil area received via notification from the subject setting unit 153 the focus detection area. In this way, the position of the focus lens 104 is set so that the lens unit 101 focuses on the pupil area. Note that the information of the selected pupil area may be used in other processing such as automatic exposure control.

According to the present embodiment, when a predetermined feature area is detected from the image data, partial areas that contain the feature area are detected on the basis of different methods and the feature area is detected for each partial area. Thus, if conditions hinder one method from detecting a partial area, the likelihood of another method detecting a partial area is increased and the likelihood that a final feature area can be detected is increased. Also, in the case in which partial areas of the same subject can be detected using both methods, one that is determined to have the better detection result of the feature area is selected from the partial areas. Thus, the reliability of the detection result can be improved.

Second Embodiment

Next, the second embodiment of the present invention will be described. The present embodiment is the same as the first embodiment except for the configuration and the operation of the feature area detection part. Thus, in the following description, the feature area detection unit will be focused on.

Figure 6:
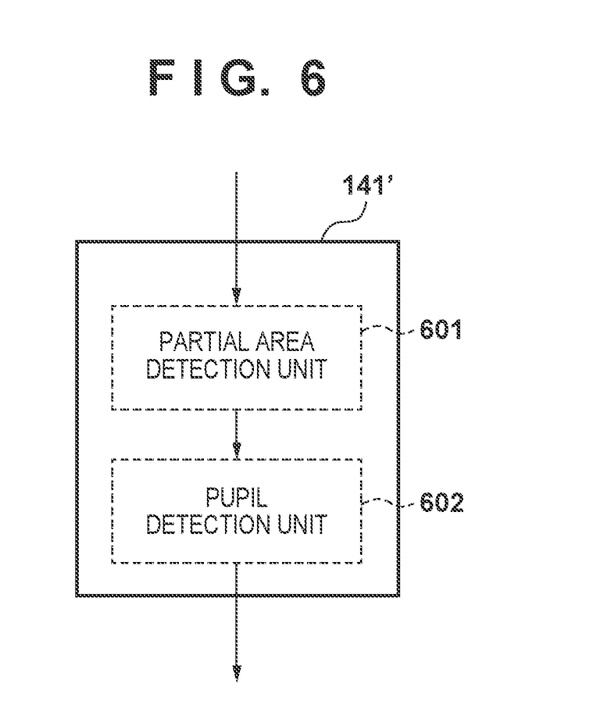
FIG. 6 is a functional block diagram of a feature area detection unit of a second embodiment.

FIG. 6 is a diagram schematically illustrating a feature area detection unit 141' of the present embodiment. As can be seen from a comparison with FIG. 2, the feature area detection unit 141' of the present embodiment includes a partial area detection unit 601 that functions as both a face detection unit and a head detection unit and a pupil detection unit 602 that functions as both a first and second pupil detection part.

The partial area detection unit 601, for example, may be a detector using a neural network trained to detect a face area and a head area. Because one detector has been trained with face areas and head areas, partial areas can be detected with different algorithms while also keeping the circuit scale small.

The pupil detection unit 602 detects a pupil area or an eye area for each partial area detected by the partial area detection unit 601. The detection method may be the same as that used in the first embodiment.

Figure 7:
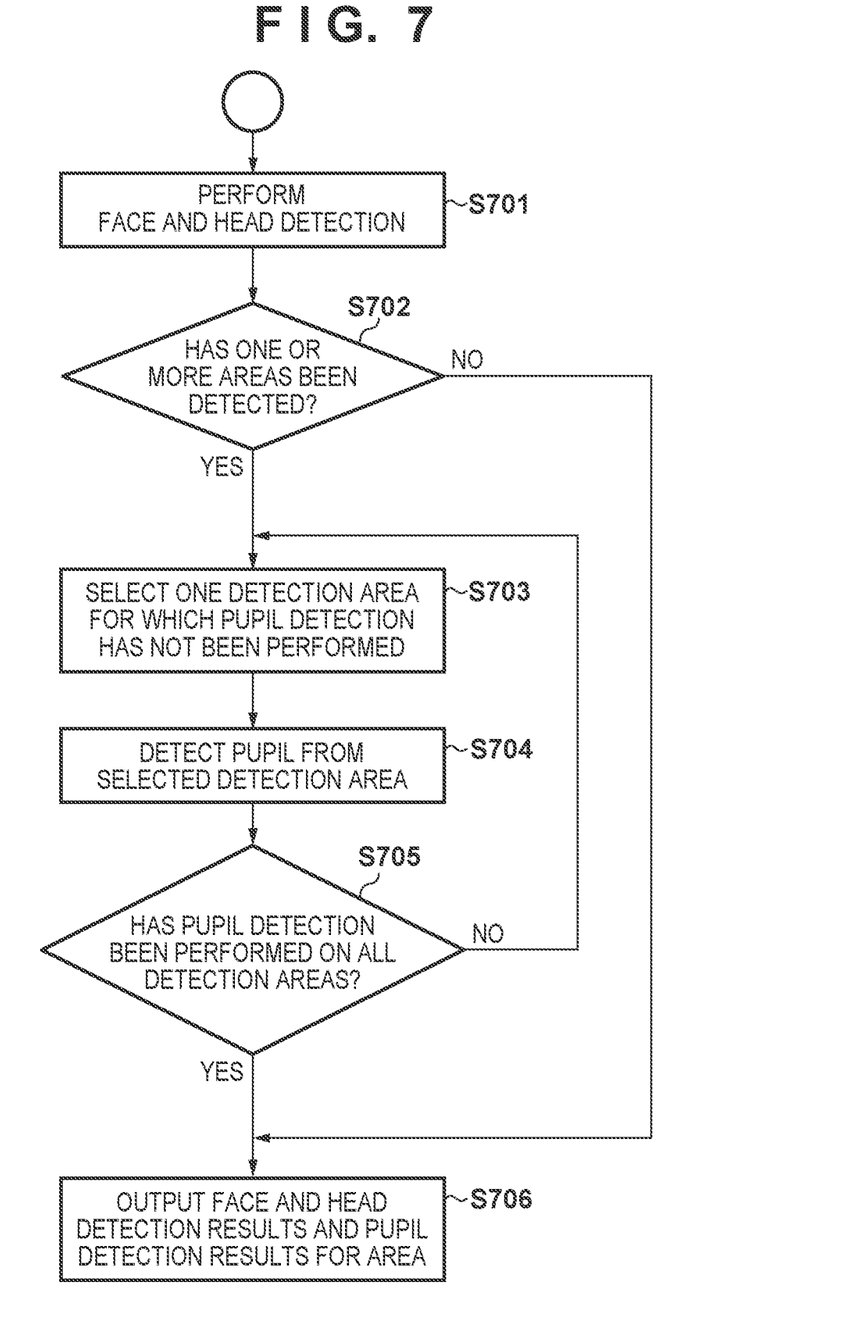
FIG. 7 is a flowchart relating to the operation of the feature area detection unit of the second embodiment.

Next, the operation of the feature area detection unit 141' will be described using the flowchart of FIG. 7. The flowchart of FIG. 7 corresponds to the flowcharts of FIG. 3 and FIG. 4 of the first embodiment.

In step S701, the partial area detection unit 601 detects partial areas (a face area and a head area) from the supplied image data. Face detection processing is applied to the partial areas. The partial area detection unit 601 outputs the detection results to the pupil detection unit 602 and holds the detection results.

In step S702, the pupil detection unit 602 determines whether or not one or more partial areas have been detected by the partial area detection unit 601. If one or more partial areas have been detected by the pupil detection unit 602, step S703 is executed. If no partial areas have been detected by the pupil detection unit 602, step S706 is executed.

In step S703, the pupil detection unit 602 sets one of the partial areas for which pupil detection has not been performed as the pupil detection area, and then step S704 is executed.

In step S704, the pupil detection unit 602 applies pupil detection processing to the pupil detection area set in step S703. Note that eye detection processing may be applied instead of pupil detection processing. The pupil detection unit 602 holds the detection results, and then step S705 is executed.

In step S705, the pupil detection unit 602 determines whether or not pupil detection processing has been applied to all of the partial areas detected in step S701. In the case in which it is determined that there is a partial area to which pupil detection processing has not been applied, the pupil detection unit 602 repeats execution of the processing from step S703. In the case in which the pupil detection unit 602 determines that pupil detection processing has been applied to all of the partial areas, the feature area detection unit 141' executes step S706.

In step S706, the feature area detection unit 141' outputs, to the camera control unit 131, the detection results held by the partial area detection unit 601 and the pupil detection results held by the pupil detection unit 602. In each of the detection results, included is information indicating at least the center coordinates (image coordinates), size, and detection reliability of the detected area. Note that in the case in which no partial areas are detected in step S702, the feature area detection unit 141' outputs an empty result.

The processing by the camera control unit 131 using the detection results of the feature area may be the same as that described in the first embodiment.

In the first embodiment, the face area and the head area are detected by different detection parts, and, for pupil detection also, the face area and the head area are detected by different detection parts. In contrast, in the present embodiment, the face area and the head area are detected by a single detection part, and the pupil area is also detected by a single detection part. In the present embodiment, the circuit scale of the feature area detection unit 141' can be made smaller than in the first embodiment. With the configuration of the first embodiment, by executing in parallel the series of processing of face area detection and pupil detection on the face area and the series of processing of head area detection and pupil detection on the head area, the processing speed can be increased.

Note that in the first embodiment, a plurality of detection parts are provided for the detection unit for the partial area and the detection unit for the feature area. In the second embodiment, only one detection unit is provided for each of the detection unit for the partial area and the detection unit for the feature area. However, the number of detection parts for the partial area and the number of detection parts for the feature area do not have to be the same.

Two embodiments of the present invention have been described. However, the present invention is not limited to these specific embodiments. The present invention includes various modifications included within the scope of the claims. For example, three of more detection parts for the partial area may be provided. Also, in the case in which a plurality of head areas are determined to be related to the same subject as that of one face area, one head area may be selected while the information of a plurality of head areas may be used. For example, the information of the pupil areas detected in the plurality of head areas may be combined (for example, an average may be found of the positions of the pupil areas with a distance equal to or less than a threshold) and the detection location and size of a new pupil area may be calculated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-210626, filed on Nov. 21, 2019, which is hereby incorporated by reference herein in its entirety.

What is claimed is:

1. An image processing apparatus, comprising:
   one or more processors, when executing a program, function as:
   a first detection unit configured to detect a first partial area from image data using a first method and detect a second partial area from the image data using a a second method, wherein the first and second partial areas are related to an identical subject;
   a second detection unit configured to detect a first feature area from (i) data of the first partial area and detect a second feature area from (ii) data of the second partial area; and
   a selection unit configured to select either one of (i) detection result of the first feature area for the first partial area and (ii) a detection result of the second feature area for the second partial area.

2. The image processing apparatus according to claim 1, wherein
   the first detection unit detects, as the first partial area, a partial area expected to contain the first feature area and detects, as the second partial area, a partial area expected to contain the second feature area.

3. The image processing apparatus according to claim 1, wherein:
   the first partial area is a face area; and
   the second partial area is a head area.

4. The image processing apparatus according to claim 1, wherein
   each of the first feature area and the second feature area is an eye area or a pupil area.

5. The image processing apparatus according to claim 1, wherein
   the selection unit determines, from among a plurality of the second partial areas, a partial area related to an identical subject as that of the first partial area, based on an overlap ratio with the first partial area.

6. The image processing apparatus according to claim 1, wherein
   the selection unit selects one of the detection results that is determined to be better.

7. The image processing apparatus according to claim 1, wherein
   the selection unit selects one of the detection results that is determined to be better in feature area detection reliability.

8. The image processing apparatus according to claim 1, wherein
   the first detection unit includes a first detection part that detects the first partial area using the first method and a second detection part that detects the second partial area using the second method, and the first detection part and the second detection part operate in parallel.

9. An image capture apparatus, comprising:
   an image capture device that generates image data;
   one or more processors, when executing a program, function as:
   a first detection unit configured to detect a first partial area from image data using a first method and detect a second partial area from the image data using a second method, wherein the first and second partial areas are related to an identical subject;
   a second detection unit configured to detect a first feature area from (i) data of the first partial area and detect a second feature area from (ii) data of the second partial area; and
   a selection unit configured to select either one of (i) a detection result of the first feature area for the first partial area and (ii) a detection result of the second feature area for the second partial area; and
   a control unit configured to perform focus detection and/or exposure control of the detection result of the feature area selected by the selection unit.

10. An image processing method executed by an image processing apparatus, comprising:
- detecting a first partial area from image data using a first method and detecting a second partial area from the image data using a second method, wherein the first and second partial areas are related to an identical subject;
- detecting a first feature area from (i) data of the first partial area and detecting a second feature area from (ii) data of the second partial area; and
- selecting either one of (i) a detection result of the first feature area for the first partial area and (ii) a detection result of the second feature area for the second partial area.

11. A non-transitory machine-readable medium storing a program, when executed by one or more processors, causes the one or more processors to function as an image processing apparatus that comprises:
- a first detection unit configured to detect a first partial area from image data using a first method and detect a second partial area from the image data using a a second method, wherein the first and second partial areas are related to an identical subject;
- a second detection unit configured to detect a first feature area from (i) data of the first partial area and detect a second feature area from (ii) data of the second partial area; and
- a selection unit configured to select either one of (i) a detection result of the first feature area for the first partial area and (ii) a detection result of the second feature area for the second partial area.

12. An image processing apparatus, comprising:
- one or more processors, when executing a program, function as:
- a first detection unit configured to detect a first partial area from image data using a first method and detect a second partial area from the image data using a second method, wherein the first and second partial areas are related to an identical subject;
- a second detection unit configured to detect a first feature area from (i) data of the first partial area detected using the first method and detect a second feature area from (ii) data of the second partial area detected using the second method; and
- a determination unit configured to determine a detection result of the feature area based on both of (i) the first feature area for the first partial area and (ii) the second feature area for the second partial area.

13. An image processing method executed by an image processing apparatus, comprising:
- detecting a first partial area from image data using a first method and detecting a second partial area from the image data using a second method, wherein the first and second partial areas are related to an identical subject;
- detecting a first feature area from (i) data of the first partial area detected using the first method and detecting a second feature area from (ii) data of the second partial area detected using the second method; and
- determining a detection result of the feature area based on both of (i) the first feature area for the first partial area and (ii) the second feature area for the second partial area.

14. A non-transitory machine-readable medium storing a program, when executed by one or more processors, causes the one or more processors to function as an image processing apparatus that comprises:
- a first detection unit configured to detect a first partial area from image data using a first method and detect a second partial area from the image data using a second method, wherein the first and second partial areas are related to an identical subject;
- a second detection unit configured to detect a first feature area from (i) data of the first partial area detected using the first method and detect a second feature area from (ii) data of the second partial area detected using the second method; and
- a determination unit configured to determine a detection result of the feature area, based on both of (i) the first feature area for the first partial area and (ii) the second feature area for the second partial area.

* * * * *